(12) United States Patent
Collodi

(10) Patent No.: US 6,614,431 B1
(45) Date of Patent: Sep. 2, 2003

(54) METHOD AND SYSTEM FOR IMPROVED PER-PIXEL SHADING IN A COMPUTER GRAPHICS SYSTEM

(76) Inventor: David J. Collodi, 3412 Kennedy Rd., Taylorville, IL (US) 62568

( * ) Notice: Subject to any disclaimer, the term of this patent is extended or adjusted under 35 U.S.C. 154(b) by 196 days.

(21) Appl. No.: 09/766,227

(22) Filed: Jan. 18, 2001

(51) Int. Cl.[7] .............................................. G06T 15/00
(52) U.S. Cl. ...................................................... 345/426
(58) Field of Search ................................ 345/419, 420, 345/426, 427, 582, 589, 606, 611

(56) References Cited

U.S. PATENT DOCUMENTS

| | | |
|---|---|---|
| 5,253,339 A | 10/1993 | Wells et al. |
| 5,561,746 A | 10/1996 | Murata et al. |
| 5,638,499 A | 6/1997 | O'Connor et al. |
| 5,659,671 A | 8/1997 | Tannenbaum et al. |
| 5,673,374 A | 9/1997 | Sakaibara et al. |
| 5,808,619 A | 9/1998 | Choi et al. |
| 5,835,220 A | 11/1998 | Kazama et al. |
| 5,936,613 A | 8/1999 | Jaeger et al. |
| 6,175,367 B1 | 1/2001 | Parikh et al. |
| 6,226,006 B1 | 5/2001 | Collodi |
| 6,234,901 B1 | 5/2001 | Nagoshi et al. |
| 6,251,011 B1 | 6/2001 | Yamazaki |
| 6,290,604 B2 | 9/2001 | Miyamoto et al. |
| 6,342,885 B1 | 1/2002 | Knittel et al. |

OTHER PUBLICATIONS

Moller et al.; Real Time Rendering, A. K. Peters, Ltd., 1999.
Foley et al.; "Computer Graphics: Principles and Practice" pp. 736–744, 866–869, 1996.
PCT Search Report; Form PCT/1SA/220, mailed Jul. 28, 1999, pp. 1–4.
Printout of Evans & Sutherland E&S Harmony Image home page at website http://www.es.com/image–generators/harmony.html, Apr. 6, 1999, 6 pages.
OTMPHONG.Doc, Mortensen, Zach; Mar. 30, 1995, reprinted from Internet.
Fast Phong Shading, Bishop and Weimer, 1986, pp. 103–105, reprinted from Internet.
Dana et al., "Reflectance and Textures of Real–World Surfaces," *AMC Transactions on Graphics*, vol. 18, No. 1, Jan. 1999, pp. 1034.
Ward, "Measuring and Modeling Anisotropic Reflection." *Computer Graphics*, 26, Jul. 2, 1992.
Becker et al., "Smooth Transitions between Bump Rendering Algorithms," undated.
Jos Stam, "Diffraction Shaders," Alias/wavefront, SIGGRAPH 1999.
Westin et al., "Predicting Reflectance Functions from Complex Surfaces," *Computer Graphics*, 26, Jul. 2, 1992.
Foley et al. "Computer Graphics: Principles and Practice" pp. 736–744, 866–869, 1996.*

* cited by examiner

*Primary Examiner*—Almis R. Jankus
(74) *Attorney, Agent, or Firm*—Brinks Hofer Gilson & Lione

(57) ABSTRACT

A method for shading polygon surfaces in a real time rendering system. Providing at least one polygon surface to be shaded. The polygon surface having a plurality of pixels and including at least one surface angle. Providing at least one point light source. Calculating using computer hardware, for substantially each drawn pixel of said polygon surface, a substantially normalized 3D surface direction vector and a 3D point light vector.

17 Claims, 9 Drawing Sheets

METHOD AND SYSTEM FOR IMPROVED PER-PIXEL SHADING IN A COMPUTER GRAPHICS SYSTEM

BACKGROUND OF THE INVENTION

The present invention relates to the field of per-pixel lighting in real-time three-dimensional ("3D") computer graphics hardware and software. Primarily, most real-time computer graphics systems rely on per-vertex lighting schemes such as Gouraud shading. In this scheme, the curvature of a polygon surface is represented through different surface normal vectors at each polygon vertex. Lighting calculations are carried out for each vertex and the resultant color information is interpolated across the surface of the polygon. Lighting schemes such as Gouraud shading are generally utilized for their speed and simplicity of operation since they require far less calculation than more complex strategies. Per-pixel lighting, in contrast, is a lighting strategy in which separate lighting calculations for one or more light sources are carried out for each pixel of a drawn polygon. Most well-known per-pixel lighting strategies are variations on a basic vertex normal interpolation scheme, i.e., Phong shading. Vertex normal interpolation strategies interpolate the normal vectors given at each vertex throughout the polygon surface. For each pixel, the interpolated vertex normal is normalized to unit length and then used in per-pixel lighting calculations. Typically the per-pixel calculations involve taking the dot product of the normal vector and the light source vector to arrive at a light source brightness coefficient. While fast per-pixel dot product hardware is not infeasible with the speed and complexity of today's microprocessors, the calculations involved in normalizing the interpolated vertex vector (i.e.,floating point square root and division) are prohibitive for practical real-time implementation at high speed.

Another per-pixel lighting technique, commonly referred to as bump mapping, involves using a two-dimensional ("2D") map to store surface height or orientation and using texel values from this map to perturb a (usually interpolated) surface normal vector. Calculation in traditional combinational bump mapping (i.e.,where the bump map angle perturbation is combined with a potentially changing surface normal) mostly involves resolving the bump map perturbation to a 3D vector that is subsequently combined with the surface normal vector. Since the surface normal vector may change from pixel to pixel, an appropriate, usually orthogonal, orientation must be given to the bump map vector. This process usually requires additional normalization and a significant computational overhead, making combinational bump mapping approaches impractical for efficient real-time calculation. A well-known method of avoiding these calculations is to store a bump map as a collection of normalized 3D vectors, therefore avoiding the need for normalization and combination. While this strategy is more practical for real-time implementations, it has several drawbacks. Such a system is inflexible since bump maps may only be used for objects in preset orientations, and surface curvature must be represented within in the bump map rather than through vertex normals as in Phong shading and its equivalents. Furthermore, the accuracy of the image is limited by the granularity of the bump map, since values falling between adjacent texels are traditionally interpolated but not re-normalized. Another drawback of the above-mentioned bump mapping scheme is the size and inflexibility of the bump maps. Since the bump map texels contain 3D vectors, medium to large complexity maps will occupy a great deal of memory. Also, due to the specific nature of the bump maps, they are generally only usable on the surfaces for which they were designed; therefore such bump maps are not often used for multiple surfaces.

A further aspect of per-pixel lighting is the calculation of intensity of specular reflections. Traditionally, the calculation of specular reflection involves the dot product of the light source vector and the view reflection vector (the view, or eye, vector reflected around the surface normal vector). Alternately, the same calculation can be made with the dot product of the view vector and the reflection of the light vector around the normal. In either of the alternatives, at least one vector must be reflected around a surface normal vector that potentially changes from pixel to pixel. The calculation required to obtain a reflected vector, while not as costly as bump map combination, is nonetheless significant.

Yet another complication in per-pixel lighting is presented by the cases of point light sources and point view vectors. Point light sources involve a light vector that changes on a per-pixel basis. Traditionally, the difference vector between the surface point and the light source is calculated and normalized for each pixel, which is computationally undesirable for efficient calculation. Likewise, point view vectors involve a view vector that changes on a per-pixel basis. Utilizing point view vectors also requires the calculation and normalization of a difference vector on a per-pixel basis.

The application of the aforementioned per-pixel lighting techniques provides visually enhanced, higher quality and more realistic images than today's real-time image generators are capable of producing. While techniques exist which can provide similar images, these techniques are difficult to implement and inflexible to use. Therefore, there exists a real need for a practical and efficient apparatus and method that provides vertex normal interpolation, combinational bump mapping, specular reflection calculation, and support for point lighting and point viewer within real-time 3D graphics systems.

SUMMARY OF THE INVENTION

The present invention is directed to a method for shading polygon surfaces in a real time rendering system. The method includes the step of providing at least one polygon surface to be shaded. The polygon surface having a plurality of pixels and including at least one surface angle. The method also includes the step of providing at least one point light source. The method further includes the step of calculating using computer hardware, for substantially each drawn pixel of said polygon surface, a substantially normalized 3D surface direction vector and a 3D point light vector.

DETAILED DESCRIPTION OF THE PREFERRED EMBODIMENTS OF THE INVENTION

Figure 1:
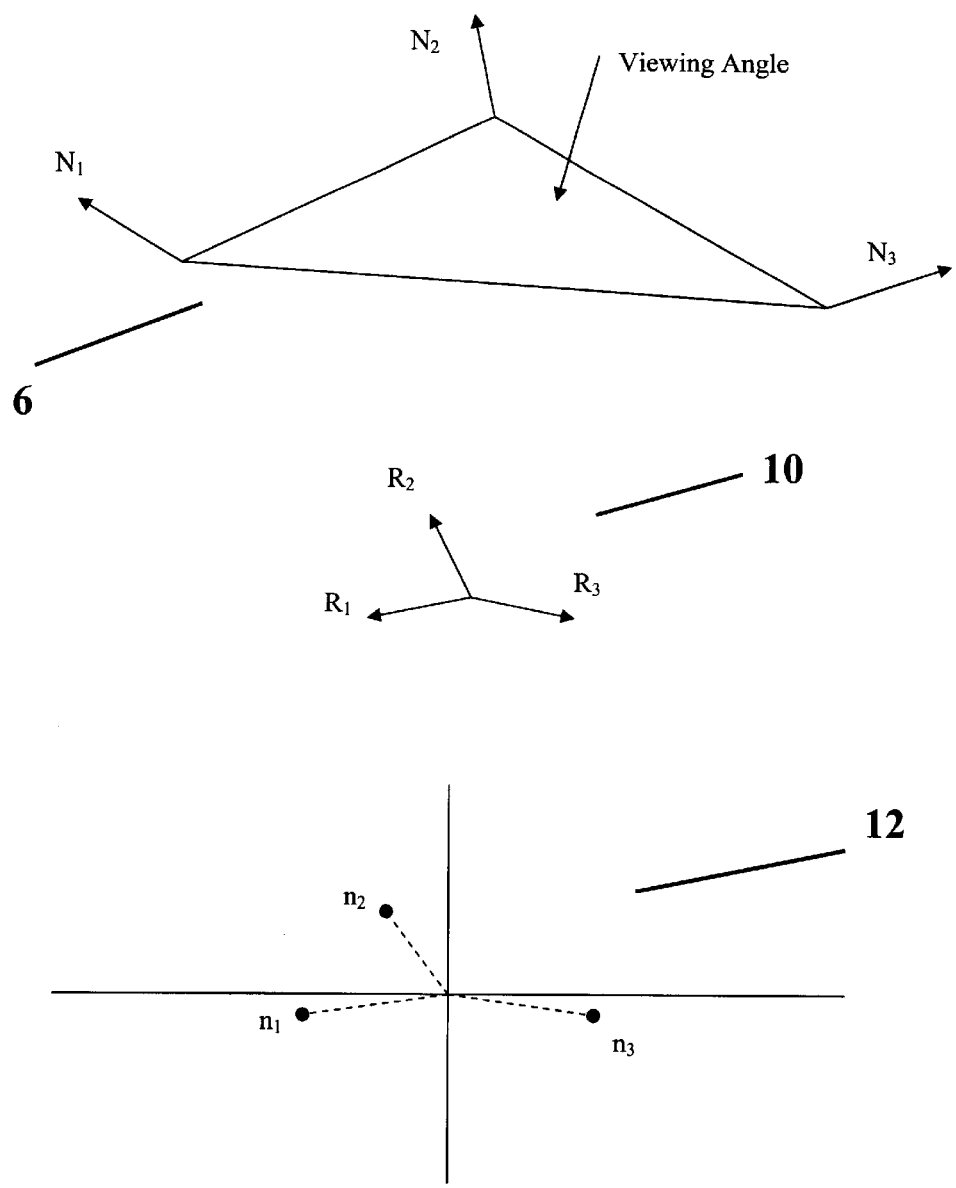
FIG. 1 is a diagram illustrating the translation of normal vectors to a view coordinate system in accordance with a preferred embodiment of the invention.

The present invention provides a method and system for the efficient calculation of complex per-pixel lighting effects in a real-time computer graphics system. For the purposes of this disclosure, the term "real-time computer graphics system" is defined as any computer based system capable of or intended to generate images at a rate greater than or equal to 10 images per second. Some examples of real-time computer graphics systems include: stand-alone console videogame hardware, 3D graphics accelerator cards for PC's and workstation class computers, multipurpose set top boxes, virtual reality imaging devices, and imaging devices for commercial or military flight simulators. All of the above-mentioned systems are likely to benefit from the increased image quality afforded by the methods and practices of the present invention.

As used herein, the term "angle-proportional" is defined as a characteristic of a 2D vector wherein the length of the 2D vector is proportional to the angle between a 3D direction vector (corresponding to said 2D vector) and a 3D axis vector (usually representing the z-axis of a pre-defined coordinate system).

As also used herein, the term "view coordinate system" is defined as a 3D coordinate system (which can be defined by a 3D position vector and at least three 3D direction vectors) that represents the position and orientation from which a 3D scene is being viewed.

As further user herein, the term "view vector" is defined herein as a 3D vector representing the forward direction from which a scene is being viewed. The view vector is usually directed, either positively or negatively, along the z-axis of the view coordinate system and is expressed in world-view coordinates.

As further used herein, the term "current polygon" is defined herein as the polygon that is currently being operated on by the methods of the present invention.

Lastly, as used herein, the term "current pixel" is defined herein as the pixel within a polygon surface currently being operated on by methods of the present invention.

The present invention comprises two areas of execution within a computer graphics system:per-polygon operations and per-pixel operations. The per-polygon operations of the present invention are performed once for each polygon in a scene to which the present invention is applied. Likewise, the per-pixel operations of the present invention are performed for each drawn pixel on a polygon surface wherein the aforementioned per-polygon operations are assumed to have been previously applied to said polygon. Additionally, the present invention provides a method to enable accurate real-time calculation of point light vectors useful for advanced lighting strategies. Most of the per-polygon and per-pixel operations of the present invention are detailed in U.S. patent application Ser. No. 09/222,036 filed on Dec. 29, 1998, in the name of David J. Collodi, the disclosure of which is hereby incorporated by reference. The operations are detailed herein for purposes of consistency and example.

The per-polygon operations of the present invention are performed in order to provide a set of angle-proportional surface angle vectors to be utilized within the per-pixel operations. For the purposes of simplicity, this disclosure shall assume the existence of a polygon to be rendered wherein said polygon provides a 3D surface normal vector for each of its vertices and said polygon is the current polygon. The surface normal vectors are used to collectively specify the amount of curvature along the polygon surface.

First, the surface normal vectors of the current polygon are rotated to correspond to the direction of the view coordinate system. It is well known in the art that a 3D coordinate system (or rather the translation to a particular 3D coordinate system) can be represented by a 4×4 matrix. A 4×4 matrix can represent both rotational and positional translations. Since the rotation of surface normal vectors requires only rotational translations, a 3×3 matrix, M, is used. Each surface normal vector, $N_i$, is multiplied by matrix M to produce a corresponding rotated surface vector, $R_i$.

$$M*N_i=R_i \qquad (1)$$

The above calculation is performed for each surface normal vector belonging to the current polygon, $N_1-N_x$, where x is the number of vertices in the polygon. After this calculation is performed for each surface normal vector (i.e., for each vertex), a set of rotated surface vectors, $R_1-R_x$, is produced. The purpose of performing this rotation to view coordinate space is to provide a common orientation to all polygons in the rendered frame. Additionally, all 3D directional and point light source vectors to be used in the lighting of the current polygon must be translated to the view coordinate system as well. The translation of said 3D light source vectors is accomplished by the same, above-mentioned, translations used to translate the surface normal vectors. The result of the 3D light source vector translation is a set of corresponding 3D rotated light vectors that are expressed relative to the view coordinate system.

Figure 2:
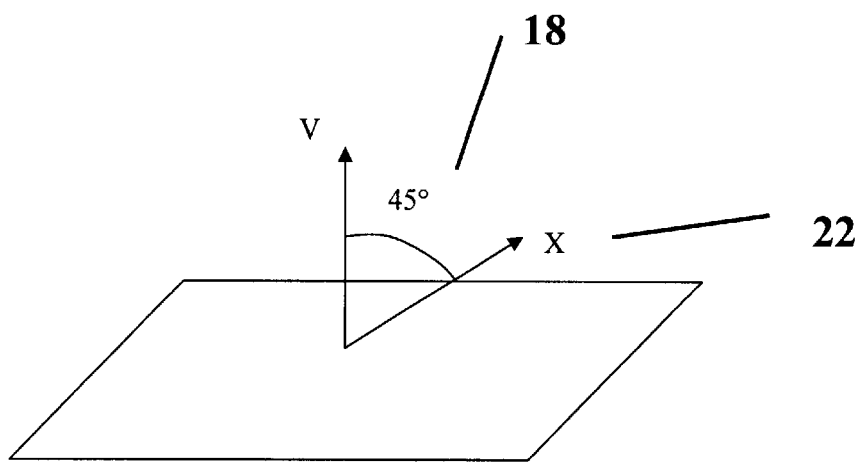
FIG. 2 is a diagram illustrating the conversion of a 3D vector into an angle-proportional 2D vector in accordance with a preferred embodiment of the invention.
Figure 2:
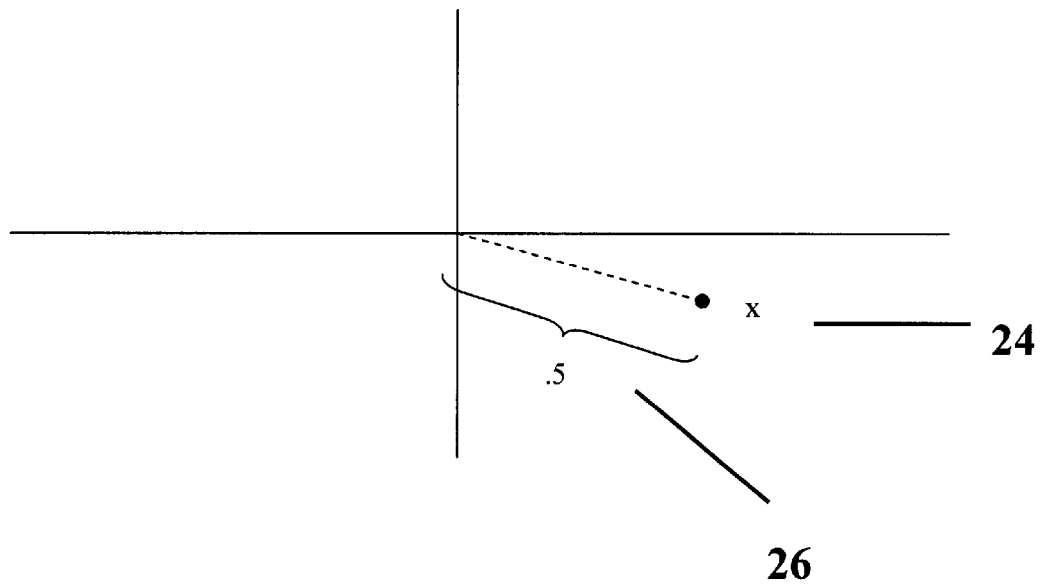

Next each rotated vector, $R_i$, is transformed to an angle-proportional 2D surface angle vector, $n_i$, where the length of $n_i$ is proportional to the angle between $R_i$ and its z-axis. A procedure for the transformation of a 3D vector into a corresponding angle-proportional 2D vector is detailed in the above-identified Collodi U.S. patent application Ser. No. 09/222,036. After transforming each R vector, a set of 2D surface angle vectors, $n_i-n_x$, are created. Each n vector is angle-proportional to its corresponding R vector. FIG. 1 demonstrates a translation of normal vectors, 6, to a view coordinate system. The resulting R vectors 10 and corresponding n vectors 12 are illustrated. As a result of the transformations detailed in Collodi U.S. patent application Ser. No. 09/222,036, an angle-proportional vector length of 1.0 corresponds to an angle of 90° between the original 3D vector and its z-axis. This is demonstrated by FIG. 2, wherein the vector 22 is converted to the angle-proportional 2D vector 24 where the length of the 2D vector, 26, corresponds to the angle between the original vector and its axis vector 18. The preceding scale of angle-proportional vectors will be used herein for purposes of clarity and example only. Those of ordinary skill in the art should recognize that the resultant angle-proportional vectors can be transformed into any arbitrary 2D coordinate system.

Furthermore, although the present disclosure presents angle-proportional vector values in floating point format, this is done for purposes of example only and it may be more efficient in practice to work with angle-proportional vectors in a fixed-point format. For example, a value of 1.0 could be represented as 256 in a fixed-point format, whereas 2.0 is represented as 512 and so on. It is a preferred practice of the present invention to deal with fixed-point 2D vectors.

An optional step is to limit the vectors that are far from the view angle. The direction of vectors at or near 180° from the viewer is unstable. It is therefore advantageous to limit the direction and distance of these vectors. An example of a basic limiting method is detailed in the following disclosure. First, a 3D vector U is obtained where the direction of U is perpendicular and normal to the plane of the polygon (i.e., U is the "real" polygon surface normal vector). Next the x and y components of U are scaled by dividing each component by the larger component (either x or y) of U. Then the scaled x and y components of U are doubled. The scaled x and y components of U form 2D vector u which represents the angle-proportional direction of the polygon surface at (or slightly greater than) 180°. Angle-proportional n vectors with large angles relative to the viewer (which can easily be derived from the z-coordinate of the corresponding R vector) are interpolated with the u vector weighted on the relative angle (to viewer) of the n vector.

A further optional step at this point is to calculate a 2-dimensional bump map rotation value. Since a bump map, in whatever format it is presented, is basically a 2D texture map, the map itself has its own local coordinate system, i.e., which direction is up, down, left, right, etc. The bump map is mapped arbitrarily onto the polygon surface and therefore may not necessarily share the same orientation as the view coordinate system. Since bump map perturbations will be done in 2D space, only a 2D rotation value is necessary to specify the 2D rotation of the bump map coordinate system relative to the view coordinate system. A simple method of obtaining said bump map rotation is to perform a comparison of the bump map orientation (using the bump map coordinate values provided at each polygon vertex) to the screen orientation of the translated polygon (since the screen orientation corresponds directly to the view coordinate system). Two 2D bump map rotation vectors are required to specify the translation from the bump map orientation to the view orientation. The use of any known techniques to obtain said 2D vectors is acceptable. In one embodiment of the present invention, the bump map orientation vectors are used to rotate each of the above mentioned 2D surface angle vectors, $n_i$–$n_x$, to the bump map orientation. Additionally the aforementioned 3D rotated light vectors must also be rotated (in the x-y plane) to the bump map orientation. This is accomplished by applying the bump map rotational translations to the x and y coordinate of each 3D rotated light vector. An alternate embodiment uses (the inverse) of the bump map orientation vectors to translate 2D bump map vectors into the view coordinate system as opposed to translating surface angle and light vectors to the bump map coordinate system.

The next section details the per-pixel operations of the present invention. As previously stated, the per-pixel operations of the present invention are performed for at least each visible pixel on the screen surface of the current polygon during the scan-line conversion of the polygon. Note that the per-pixel operations detailed herein need not be performed concurrently with the drawing of the current polygon to video RAM. Alternate embodiments of the present invention perform per-pixel lighting operations prior to final rendering to screen memory. Additional embodiments of the present invention perform per-pixel lighting operations after color values have been placed in screen memory. It is, however, a preferred method to perform per-pixel lighting operations concurrently with the drawing of color values to screen memory.

Initially, the previously mentioned set of 2D surface angle vectors is interpolated from their vertex values, $n_i$–$n_x$ as previously defined, to the location of the current pixel. Techniques for interpolating vertex values to an arbitrary point within a polygon are well known to those skilled in the art. Any interpolation strategy can be used including, but not limited to, linear interpolation, inverse (perspective-correct) interpolation, quadratic or cubic interpolation. The interpolation of 2D surface angle vectors produces an aggregate 2D surface angle vector, n, which represents the orientation of the polygon surface at the current pixel. In circumstances where the orientation of the polygon surface does not change, i.e., flat surfaces, it is not necessary interpolate the n value from given vertex values since all vertex values would be the same. In this case, a fixed n value may be used which is generally, although not necessarily, equivalent to the normal surface orientation of the current polygon.

Next, the aggregate surface angle vector, n, is combined with a 2D bump map vector, b. In one embodiment of the present invention, the bump map vector is obtained from a given bump map and accessed by interpolated bump map coordinates given at the polygon vertices in accordance with standard vertex mapping techniques well-known by those skilled in the applicable art. The 2D bump map vector may be obtained directly from the texel values stored in the bump map. Alternately, the 2D bump map vector may be calculated from retrieved texel values stored in the bump map. One well-known example of said bump map vector calculations is storing relative height values in the bump map. Height values are retrieved for the nearest three texel values. Assuming that the texel at coordinates x, y(t(x,y)) maps to the current pixel, then texels t(x,y), t(x+1,y), and t(x, y+1) are loaded from the bump map. Since each texel contains a scalar height value, the 2D bump map vector, b, is calculated from the differences in height values in the following manner:

$$b=(t(x+1,y)-t(x,y), t(x,y+1)-t(x,y)) \quad (2)$$

An alternate method for storing bump map data involves storing a polar representation of the bump map vector a t each texel. The polar representation comprises two fields, one for the 2D angle of the bump map vector and another for the magnitude of the bump map vector. A preferred method of retrieving the 2D bump map vector from said polar representation is through the use of a lookup table. The direction and magnitude (or functions of those values) values are us ed to index a lookup table which returns the appropriate 2D bump map vector. The primary advantage of storing bump map vectors in polar representation is that the rotation of polar vectors is easily accomplished. In the aforementioned embodiments in which the bump map vector is rotated to view orientation, said rotation is facilitated by storing bump map vectors in polar representation. Rotating a polar vector involves providing a scalar angle of rotation (for example an 8-bit number where the value 256 is equivalent to 360°) and simply adding that number to the rotation value of the polar vector.

For added image quality, map based bump map values may be additionally interpolated with any well-known texel interpolation scheme such as bi-linear or tri-linear interpolation. For direct mapping schemes, i.e., where texels contain 2D bump map vectors, the vector values given at each texel are interpolated. Alternately for indirect mapping schemes, such as the height map detailed above, it is desirable to first calculate all necessary 2D bump map vectors and subsequently interpolate those vectors. It should be noted that one or more 2D bump map vectors may be combined to produce the final b vector. The ability to easily combine and aggregate multiple bump maps and/or to combine bump map perturbation with a variable surface normal is an advantageous feature of the present invention since this technique provides for a great deal of flexibility, reusability and decreased memory costs in many 3D graphics applications.

In an alternate embodiment of the present invention, 2D bump map values are calculated procedurally from a function of the surface position (and other optional values). Procedural texture/bump map techniques offer the advantages of flexibility and minimal memory usage balanced with the cost of additional calculation. Alternately, if bump mapping is not selected for the current polygon, a null b vector (0,0) can be used. In this case, it is not necessary to combine the bump map vector with the n vector and the combination step may therefore be skipped. For the purposes of clarity and continuity of the example detailed herein, a b vector of (0,0) will be used for cases in which bump mapping is not used.

Once the bump map vector, b, is arrived at, it is combined with the n vector through vector addition to produce the composite surface angle vector, c:

$$c=n+b \tag{3}$$

Figure 3:
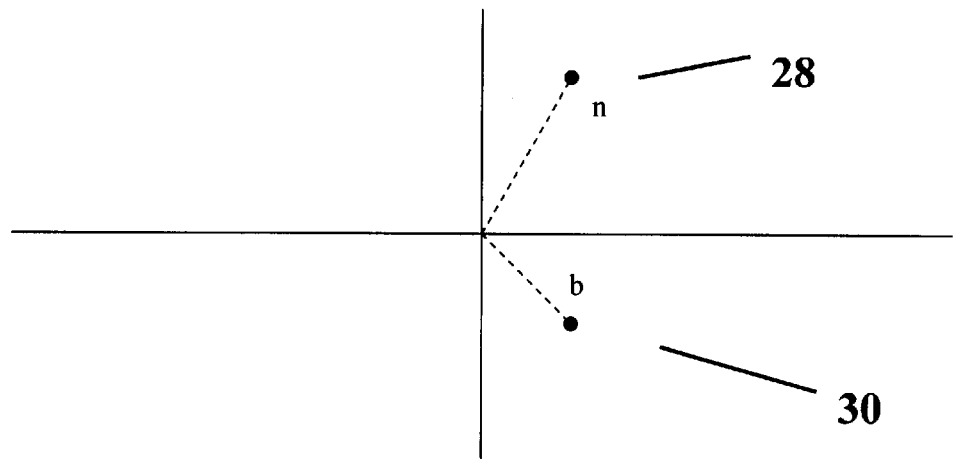
FIG. 3 is diagram illustrating the combination of a surface angle vector and a bump map vector to produce a composite surface angle vector in accordance with a preferred embodiment of the invention.
Figure 3:
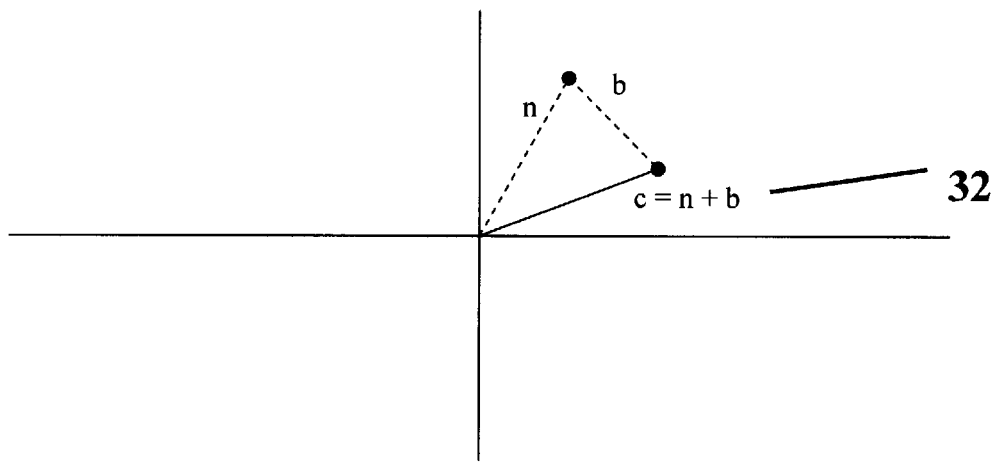

The c vector represents the composite orientation of the polygon surface at the current pixel with respect to polygon curvature and bump map perturbation. FIG. 3 demonstrates the combination of surface angle vector n 28 and bump map vector b 30 to produce the composite surface angle vector c 32. In alternate embodiments, the aforementioned c vector is used to address an environment map. Environment maps are traditionally 2D color maps that provide reflection information for a given scene. Since the c vector represents the composite orientation (due to surface bump and curvature) of the current pixel in relation to the view coordinate system, it can be used to accurately address a 2D environment map that is also (traditionally) relative to the view coordinate system. By addressing an environment map in this manner, a consistency is maintained between lighting equations and reflection values (from an environment map). A significant feature of the present invention is the provision of a method for coordinating traditional, equation-based, lighting information with reflection (environment map) values in a real-time 3D graphics system.

Once the c vector is arrived at, the view reflection vector is next calculated. The view reflection vector represents the direction the view vector reflects off of the surface at the current pixel. Since the 2D vector coordinate space is angle-proportional to the view vector, the direction of the view vector is located at coordinates (0,0). Consequently, the 2D view reflection vector, r, reflected around the c vector (which represents the current pixel surface orientation) is simply the c vector doubled:

$$r=2c \tag{4}$$

Figure 4:
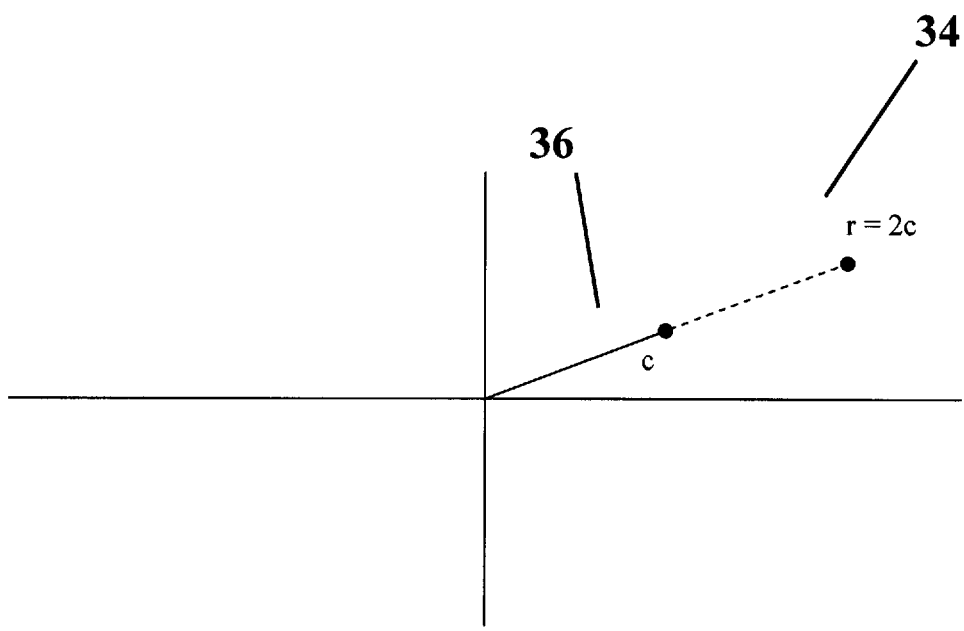
FIG. 4 is a diagram illustrating the production of a view reflection vector from a composite surface angle vector in accordance with a preferred embodiment of the invention.

FIG. 4 illustrates the production of view reflection vector r 34 from composite surface angle vector c 36.

The above calculation is accurate provided that the direction of view is always directed along the z-axis of the view coordinate system. For most applications, this assumption is accurate enough to produce visually sufficient results. However, the exact view direction varies in accordance with the screen position of the current pixel since its screen position represents an intersection between the view plane and the vector from the focal point to the object surface. The preceding scenario in which the view direction is allowed to vary with screen coordinates is commonly referred to as a point viewer. In cases in which point viewing is desired, the view reflection vector, r, must be calculated in an alternate manner. First the 2D displacement vector of the screen coordinates of the current pixel and the screen coordinates of the center of the screen must be found. Assuming the screen coordinates of the current pixel are represented by 2D vector p, and the screen coordinates of the center of the screen are represented by 2D vector h, the 2D displacement vector, d, is calculated as follows:

$$d=p-h \tag{5}$$

Next, 2D displacement vector d is converted to an approximately angle-proportional 2D offset vector, o. The most straightforward way to convert d to o is to multiply d by a scalar value, y, representing the ratio of the viewing angle to the screen width. The viewing angle represents the total angle from the focal point to the two horizontal (or vertical) edges of the screen and should be given in the same angle-proportional scale as other angle-proportional vectors (in this example, a value of 1.0 representing 90°). The screen width is just the width (or height) of the screen in pixels. For example, if the viewing angle is 45° and the screen is 100 pixels wide, the y value would be 0.5/100, or 1/200. The o vector is calculated as follows:

$$o=d*x \tag{6}$$

In order to calculate view reflection vector, r, in the case of a point viewer, the r vector is positively displaced by o. The formula for r is:

$$r=2c+o \tag{7}$$

Figure 5:
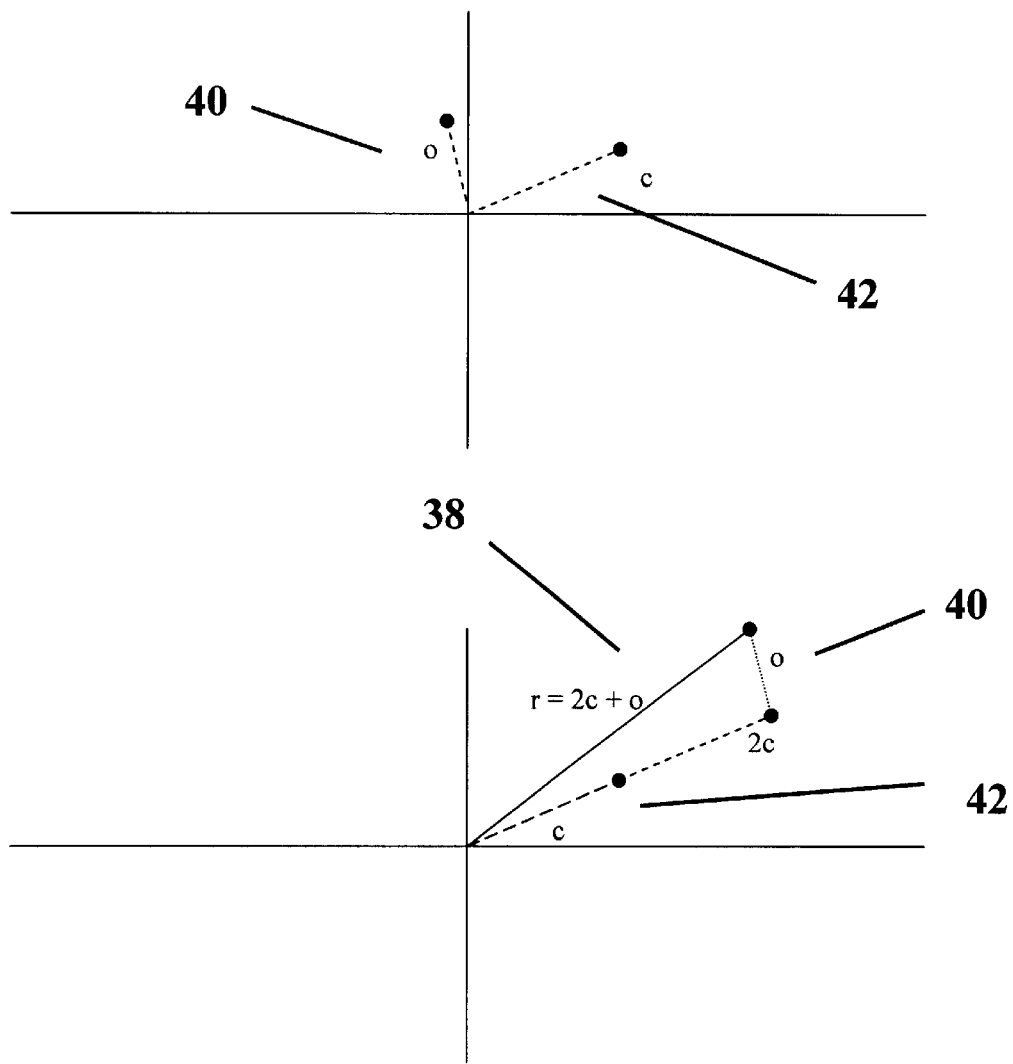
FIG. 5 is a diagram illustrating the calculation of the view reflection vector.

The calculation is illustrated in FIG. 5, where view vector r 38 is found by doubling vector c 42 and adding vector o 40.

It should be noted that the above formula is only an approximation of the true view reflection vector. However, the approximate view reflection calculated by the preceding formula is able to produce visually consistent and convincing images with little or no discernable loss in image quality. In alternate embodiments of the present invention, the r vector, as opposed to the c vector, is used to address an environment map as previously detailed.

Once the 2D composite surface angle vector and view reflection vector are calculated, they are next transformed into normalized (unit length) 3D vectors. The 2D composite surface angle vector, c, is transformed into normalized 3D composite surface vector C. Likewise, 2D view reflection vector, r, is transformed into normalized view reflection vector A. The conversion from a 2D angle-proportional vector to a normalized 3D vector by mathematical calculation is computationally expensive in terms of hardware complexity and computation time. Therefore, it is a preferred practice of the present invention to perform said conversion from 2D angle-proportional vector to normalized 3D vector with the aid of a lookup table. The use of a lookup table offers the advantage of being able to produce normalized composite surface and reflection vectors without using a square root operation. The complexity of the square root operation combined with the difficulty of calculating 3D composite surface and view reflection vectors has heretofore prohibited practical real-time calculation of complex lighting effects. Methods of the present invention using lookup tables, therefore, represent a significant improvement in the real-time calculation of complex per-pixel lighting effects.

A preferred lookup table method is to use fixed point x and y coordinates of an angle-proportional vector to directly access a 2D lookup table wherein said lookup table contains normalized 3D vectors. The vectors contained in the lookup table may be stored in either floating point or fixed-point format. For matters of efficiency, however, it is a preferred practice of the present invention to store 3D lookup table vectors in fixed-point format. For example, a fixed-point format of 8 bits per vector component, i.e., 24-bits per 3D vector, would provide sufficient accuracy while minimizing the size of the lookup table. Fixed point 3D vectors obtained from the lookup table can easily be converted to floating point format for further calculation if necessary. In order to further enhance visual consistency, lookup table vectors can be interpolated using any of a number of well-known interpolation techniques including, but not limited to, bi-linear and tri-linear interpolation, quadratic interpolation and cubic interpolation. The size of the lookup table can be additionally decreased due to the fact that the coordinate system is symmetric about the x and y axis. Therefore the lookup table need only cover the positive x/positive y quadrant. To utilize such a lookup table, negative x and y coordinates (in the 2D vector used to address the table) are first negated and the 3D vector is retrieved (and optionally interpolated) from the table. Then the corresponding x and/or y coordinates in the 3D vector are negated provided that the x and/or y coordinates of the 2D addressing vector were originally negative. Since several vector additions may be performed on angle-proportional vectors, the final c and r vectors can have lengths greater than 2.0 (equivalent to 180°). Therefore, the 2D lookup table must at least cover coordinate values ranging from 0 to 2.0. A 512×512 map should be of sufficient accuracy to cover such a range, however larger maps may be implemented depending on the desired accuracy.

An alternate embodiment of the present invention utilizes a one-dimensional lookup table. The lookup table is addressed by the square of the length of the above-mentioned addressing 2D angle-proportional vector. Each lookup table element contains two elements: a z-value and a scalar value s. The z-value is used as the z-coordinate for the resultant 3D vector while the s value is used to scale the x and y values of said addressing 2D vector yielding the x and y values of said resultant 3D vector. The above-mentioned one-dimensional lookup table strategy provides a significant memory savings over the aforementioned 2D lookup table, but also incurs a higher computational cost.

The lookup table strategies detailed above are presented for the purpose of example only and, as can be recognized by someone skilled in the applicable art, any adequate lookup table strategy may be employed without departing from the scope of the present invention as defined by the appended claims and their equivalents.

Regardless of the calculation method applied, the conversion of 2D vectors c and r to normalized 3D vectors produces unit-length 3D composite surface vector C and unit-length 3D view reflection vector A. The C and A vectors can then be used in calculating diffuse and specular light coefficients for any number of light sources. Given a light source whose direction is represented by unit-length light source vector L, the diffuse coefficient, $c_d$, of said light source at the current pixel is given by:

$$c_d = L*C \tag{8}$$

While the specular coefficient, $c_s$, is given by:

$$c_s = L*A \tag{9}$$

The specular coefficient value $c_s$ is optionally applied to a specularity function to account for surface reflectivity characteristics. For example, a commonly used specularity function raises the $c_s$ value to a given power, exp, where the higher exp values produce "shinier looking" specular highlights.

A further alternate embodiment utilizes a one-dimensional lookup table as in the previously mentioned lookup table strategy. As with the aforementioned strategy, a z-value and scalar s value are provided by the lookup table. In this embodiment, however, the s value is not used to scale the x and y values of the addressing vector. Rather, the addressing vector, with the aforementioned z-value included, is used as a 3D vector in the above mentioned diffuse and/or specularity dot product calculation. The result of the dot product calculation is then scaled by the s vector to produce the correct shading value as in the following equations:

$$c_d = (L*C)*s \tag{10}$$

$$c_s = (L*A)*s \tag{11}$$

Once diffuse and specular components have been calculated, they may be used as scalar values to apply diffuse and specular lighting to the current pixel. Standard color based pixel lighting algorithms utilizing scalar light coefficients are well-known to those skilled in the art. Any such lighting algorithm (which requires scalar diffuse and specular coefficient values) may be applied to modulate the color of the current pixel.

A further aspect of the present invention applies to the calculation of point light source direction vectors. As opposed to directional light sources, where the light source direction is constant within the frame, the direction of point light sources is variable across a surface. The direction at which a point light strikes a surface is determined by difference between the position of the surface and the light source. A prior art approach to the calculation of point light source direction vectors involves normalizing the difference vector between the light source position and the surface position. Since standard vector normalization requires computationally expensive division and square root operations, the application of said approach to the calculation of point light source direction vectors is infeasible for efficient real-time operation. A method is presented for the accurate calculation of point light source direction vectors that does not involve division or square root operations.

According to the present invention, a 3D difference vector, D, is obtained for at least every drawn pixel. The difference vector is found by the following formula:

$$D = P - S \tag{12}$$

where P is a 3D vector in the view coordinate system representing the location (in 3D space) of the point light source and S is a 3D vector in the view coordinate system representing the location (in 3D space) of the polygon surface at the current pixel. The preceding vector subtraction may be performed on a per-pixel basis wherein the S vector is appropriately updated for each pixel. Alternately, a set of point light source direction vectors, $D_1$–$D_x$ (where x is the number of vertices in the current polygon), may be calculated (by the above formula) for each polygon vertex and where said D value is interpolated from said direction vectors.

Once the D vector is obtained for the current pixel, a scalar value, k, is calculated where:

$$k=1/\mathrm{sqrt}(D*D) \qquad (13)$$

In a preferred embodiment of the present invention, a lookup table is used in the determination of the k value. A preferred one-dimensional lookup table contains k values (in fixed or floating point format) and is addressed by a function of $D*D$. The D vector, however, may be of arbitrary length, thereby requiring a large lookup table to determine accurate k values. Therefore, in a preferred practice, the D vector is scaled prior to the calculation of the k value. A preferred method for the scaling of the D vector is presented herein. First the largest component (either x, y, or z) of the D vector is found, i.e., max(x, y, z). Next an exponent value, n, is found from the max component value by:

$$n=\lfloor (\log_2 m) \rfloor \qquad (14)$$

where m is said maximum component value of D. Next a 3D scaled difference vector, E, is calculated where:

$$E=D/2^n \qquad (15)$$

A scalar length value, g, is next calculated by:

$$g=(D*D)/2^{2n} \qquad (16)$$

This scheme is advantageous since the n value can be found directly from the exponent field of a number in a standard floating point format and division by a power of two simply requires an exponent subtraction for floating point numbers.

Finally, the above mentioned g value is used to obtain k from the preferred lookup table method detailed previously. Once k and E have been calculated, lighting equations may now be carried out for the point light source. As defined above, the $c_d$ and $c_s$ coefficient values for the point light source at the current pixel are now determined from the following formulae:

$$c_d=(C*E)*k \qquad (17)$$

$$c_s=(A*E)*k \qquad (18)$$

where vectors C and A are the 3D composite surface vector and 3D view reflection vector as previously defined. Now lighting coefficients for a point light source have been calculated without using costly square root or division operations. This process allows for point lighting to be efficiently and practically applied in real-time image generation.

A novel and useful aspect of the present invention as disclosed above is that, in certain embodiments, it allows shading data, such as light and surface normal vectors, to be specified in a recognized standard format. In many well-known lighting systems, such as Gouraud and Phong shading, lights are specified with 3D vectors (specifying normalized direction for parallel lights and position for point lights) along with color and brightness information. Likewise, in the aforementioned lighting systems, surface curvature is specified by providing a normalized 3D surface angle vector for each polygon vertex. Also, a common format for bump map data, which is well-known to those skilled in the art, is to use a height value for each bump map texel, as detailed previously in this disclosure. The use of a common interface allows for quick cross-platform development by way of a standard programming interface. Most current 3D programming interfaces, such as OpenGL and DirectX, provide functionality for specifying standard shading data (light and surface normal vectors in the above-mentioned standard format) for lighting in 3D graphics applications. Many current programming interfaces also contain support for standard bump maps as well.

The methods and operations of the present invention do not require additional, or alternate, inputs other than the above-mentioned standard shading data, i.e., light and surface normal vector data. In the present invention, vertex normal values are specified as normalized 3D vectors and light vectors are specified in a compatible format, i.e., a 3D vector for direction or position as well as additional color and brightness information. Bump maps may be given in any of several standard formats wherein no additional, algorithm-specific information is required. The ability of the present invention to operate accurately and efficiently with standard inputs is a primary advantage. Most well-known 3D shading speed-up methods require algorithm-specific input data in order to perform correctly, thereby limiting the application of said speed-up methods to custom programming interfaces. Most 3D graphics software developers have experience in standard 3D programming interfaces and develop cross-platform applications wherein the use of said standard 3D programming interfaces is a necessity. The use of non-standard programming interfaces demanded by many 3D lighting algorithms serves as a severe limiting factor to their widespread use in industry applications. Use of the present invention is advantageous since it requires no additional, "non-standard" input data to operate correctly and efficiently. Therefore, the features of the present invention, implemented in either software or custom hardware, can be accessed by current programming interfaces without requiring software developers to produce additional, application-specific code. The present invention provides a universal shading interface whereby cross-platform applications can take advantage of the advanced lighting features of the present invention on platforms that support them, while still working correctly, i.e. defaulting to simpler shading algorithms such as Gouraud shading, on platforms that do not support advanced lighting. The methods and operations of the present invention provide for the ability to accurately and efficiently utilize advance shading techniques which are accessible through a standard 3D programming interface.

DETAILED DESCRIPTION OF A PREFERRED HARDWARE EMBODIMENT:

In order to provide maximum rendering speed and efficiency, a hardware implementation of the present invention is preferred. Since the methods of the present invention are not exceedingly complex, they are able to be implemented without excessive hardware expense in a number of 3D graphics systems including, for example, consumer-level PC graphics accelerator boards, stand-alone console video game hardware, multi-purpose "set top boxes," high-end workstation graphics hardware, high-end studio production graphics hardware, and virtual reality devices. Although a hardware implementation is preferred, those skilled in the art will recognize that alternate embodiments of the present invention may be implemented in other forms including, but not limited to: as a software computer program, as a microprogram in a hardware device, and as a program in a programmable per-pixel shading device.

The following sections describe preferred hardware implementations for the per-polygon, per-pixel, and point lighting operations of the present invention. The hardware implementation provided is used as part of, and assumes the existence of, a 3D graphics processing hardware element (such as a 3D graphics accelerator chip). The per-pixel (and point lighting) operations of the present invention serve to provide diffuse and/or specular lighting coefficients for one or more light sources. These lighting coefficients may subsequently be used in shading hardware to scale the corresponding light source colors and to use said light source colors to modulate pixel color. Techniques for utilizing light source colors and light coefficients to modulate pixel colors are numerous and well known to those skilled in the art. It is the objective of the present invention to provide an efficient method and system that produces normalized 3D composite surface and view reflection vectors and consequently produces diffuse and/or specular light coefficients for one or more light sources on a per pixel basis. Therefore, it is outside the scope of this disclosure to provide a detailed description of the above-mentioned shading hardware although it should be noted that the preferred hardware embodiment of the present invention is designed to work in conjunction with dedicated shading hardware.

Figure 6:
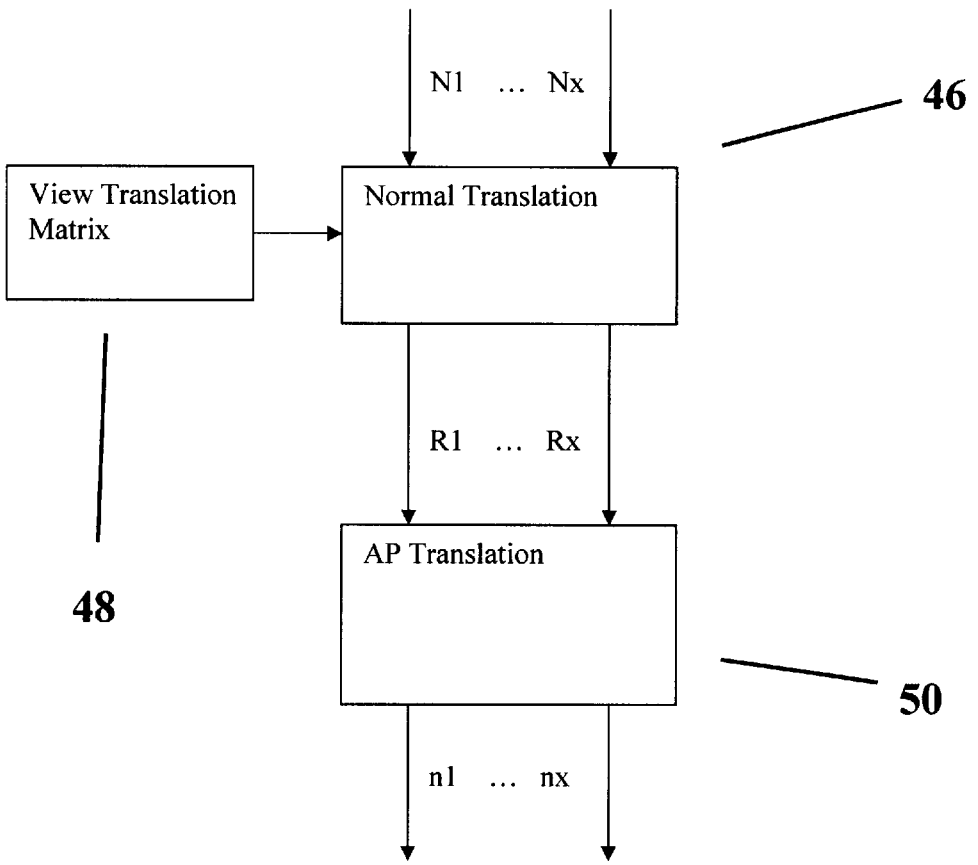
FIG. 6 is a diagram of a preferred hardware embodiment of the present invention.

FIG. 6 shows a diagram of a preferred hardware implementation of the per-polygon operations of the present invention. The hardware per-polygon operations assume the presence of a current polygon, a set of 3D surface normal vectors ($N_1$–$N_x$: x=number of polygon vertices) corresponding to the set of vertices of the current polygon, a view orientation (represented in this example in preferred form as a 3×3 matrix), and a set of 3D light source vectors ($L_1$–$L_n$: n>=1) expressed relative to the view coordinate system. The surface normal vectors should be expressed in the same reference frame as the view orientation is expressed (world-space orientation, for example) so the view orientation matrix can be used to transform the normal vectors to view-space. For the purposes of this example, and in accordance with a preferred practice of the present invention, said surface normal vectors, light source vectors and view orientation are in standard 32-bit floating-point format. At block 46, surface normal vectors $N_1$–$N_x$ are translated to view orientation by matrix multiplication of each N vector by the view translation matrix 48 using fast vector translation hardware (i.e., fast dot product circuitry, multiply-adders, etc.). In an alternate embodiment, the translation of the N vectors is done externally (i.e., by an external processor or an on-board, multi-purpose transform engine), and translated N vectors are provided. Translation of multiple vectors may be performed in series or in parallel, although, to decrease execution time, a parallel (or pipelined) approach is preferred. The 3D translated surface vectors $R_1$–$R_x$ are produced from the above-mentioned transformation. An alternate embodiment limits the R vectors if they are too near 180° from the direction of view. In this alternate embodiment, R vectors at large angles from the view are limited to less than 180° and their direction is clamped to that of the vector normal to the plane of the current polygon. At block 50, the set of R vectors are transformed into a corresponding set of angle-proportional 2D surface angle vectors $n_{1-nx}$. In order to perform said angle-proportional translations, a single AP translation unit may be used in series or, in a preferred practice, several AP translation units are used in parallel.

Figure 7:
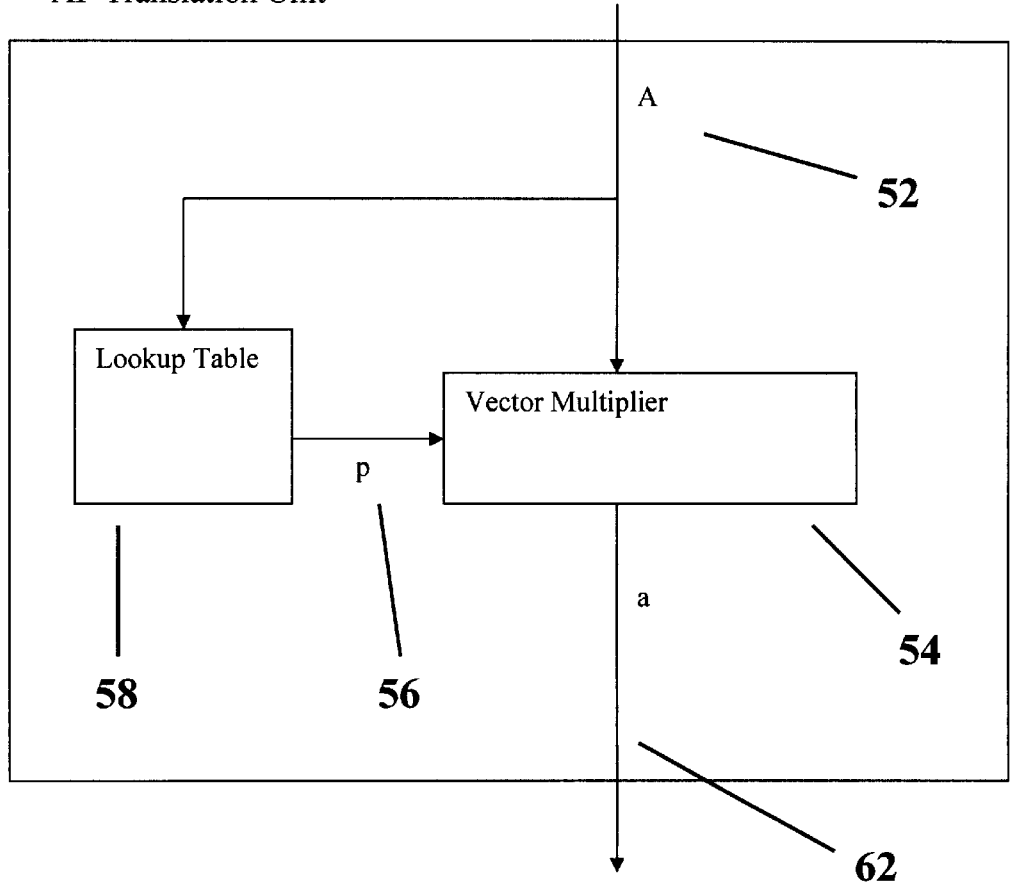
FIG. 7 is a diagram illustrating an AP translation unit in accordance with a preferred embodiment of the invention.

FIG. 7 shows a block diagram of an AP translation unit which converts a 3D vector into an 2D angle-proportional vector 62. First, the z coordinate of A is used to address a one-dimensional lookup table at block 58, which produces a proportionality value, p 56. Although the use of a lookup table is preferred, alternate embodiments may calculate p by the application of a mathematical function. At block 54, the x and y components of the A vector are multiplied by p (with fast multiplication hardware) to produce (the x and y components of) the a vector. In a preferred practice, the a vector is given in fixed point format. Alternate embodiments leave the a vector in floating point format.

After the above-mentioned set of R vectors has been transformed to the above-mentioned set of n vectors, the n vectors are then stored, preferably in a local memory, to be later used during the per-pixel operations of the present invention. Alternate embodiments calculate a bump-map rotation at this stage of operations. In said alternate embodiments, the set of n vectors and the set of light source vectors ($L_1$–$L_n$) may be rotated to the bump-map rotation. Further alternate embodiments include interpolation hardware to interpolate distant n vectors (at large angle distances from the viewer) with a 2D planar normal vector, u, as described above in the detailed description of the present invention.

Figure 8:
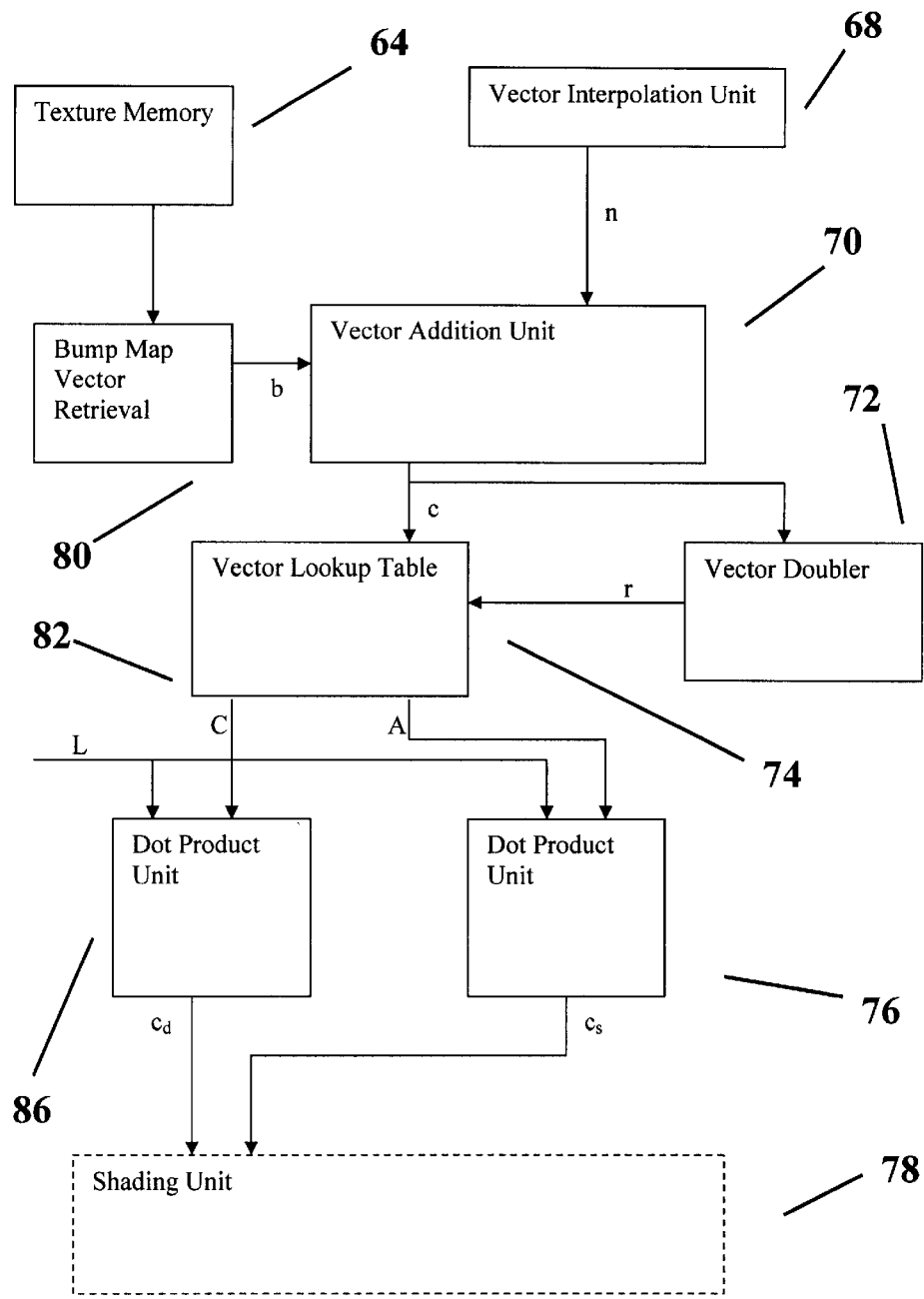
FIG. 8 is a diagram illustrating a preferred hardware embodiment of the per pixel operation of the present invention.

FIG. 8 shows a logic diagram for a preferred hardware embodiment of the per-pixel operations of the present invention. The hardware per-pixel operations assume the presence of a current polygon, a set of 3D light source vectors expressed relative to the view coordinate system, and a set of 2D surface angle vectors ($n_1$–$n_x$: x=number of vertices in current polygon) preferably calculated by the per-polygon operations of the present invention as detailed above. The per-pixel operations are assumed to be performed at least once for every drawn pixel on the surface of the current polygon. At vertex interpolation unit 68, the surface angle vectors ($n_1$–$n_x$) at the polygon vertices are interpolated at the current pixel to form the surface angle vector n. A preferred method of vertex interpolation, which is well known in the art, is to calculate the slopes (change in value per change in coordinate) of the vectors at the polygon edges and accumulate the edge value for each successive scanline. Likewise, for the current scanline, the slope is calculated and the vector value is accumulated for each pixel. In the cases where the current polygon does not represent any curvature, the above interpolation step may be omitted. At a 2D bump map vector, b 80 is obtained from a texture memory 64. A preferred method interpolates bump map coordinates from vertex values and uses the interpolated coordinate values to address the bump map. A preferred bump map format stores a 2D bump map vector at each bump map texel. Other embodiments store scalar height values at each bump map texel and calculate the b vector from said height values as detailed earlier. Further embodiments realize b vector values from a set of procedural calculations. Although not illustrated in the present example, once the b vector is found alternate embodiments translate the b vector from the bump map orientation to the view orientation preferably by the application of a 2×2 rotation matrix.

At vector addition unit 70, bump map vector b is combined by vector addition with surface angle vector n to form a composite surface angle vector c (c=n+b). The vector addition can be efficiently performed with fast addition hardware. Preferably, to simplify computation, vector values are stored and operated on in fixed-point format although alternate embodiments use vector values in floating-point format. Next, at block 72, the c vector is doubled to produce 2D view reflection vector r. Doubling the c vector is easily accomplished by left-shifting the component values of the c vector by one bit. Alternately, if the c vector is in floating point format, one is added to the exponent fields of the component values. An alternate embodiment adds a 2D offset vector, o, to r after doubling where r=2c+o. Next, the component values of the c vector are used to address 2D lookup table 82 to provide 3D composite surface vector C. In a preferred method, the lookup table values contain 3D vectors in fixed-point format. The x and y component values of c are used to address the nearest four values in said lookup table. The four lookup table values are bi-linearly interpolated to form 3D vector C. The component values of C are finally converted to floating point format for ease of subsequent calculation. Alternate embodiments of the present invention leave the C vector in fixed-point format. Further alternate embodiments store floating-point vector values in the lookup table. At 74, the 2D r vector is used to address lookup table 82 to produce 3D view reflection vector A by the same, above-detailed process as the C vector is calculated. At blocks 86 and 76, the C and A vectors are combined with light source L through the use of high speed, floating point dot product hardware to produce scalar diffuse light coefficient $c_d$ and scalar specular light coefficient $c_s$. The present example only demonstrates the calculation of diffuse and specular light coefficients for one light source. This is done for clarity of example only and it should be obvious to those skilled in the art that the calculation of coefficient values for more than one light source may easily be implemented in series or in parallel using comparable hardware. The $c_d$ and $c_s$ values are then passed to shading unit 78 where they are eventually used to modulate pixel lighting color.

Figure 9:
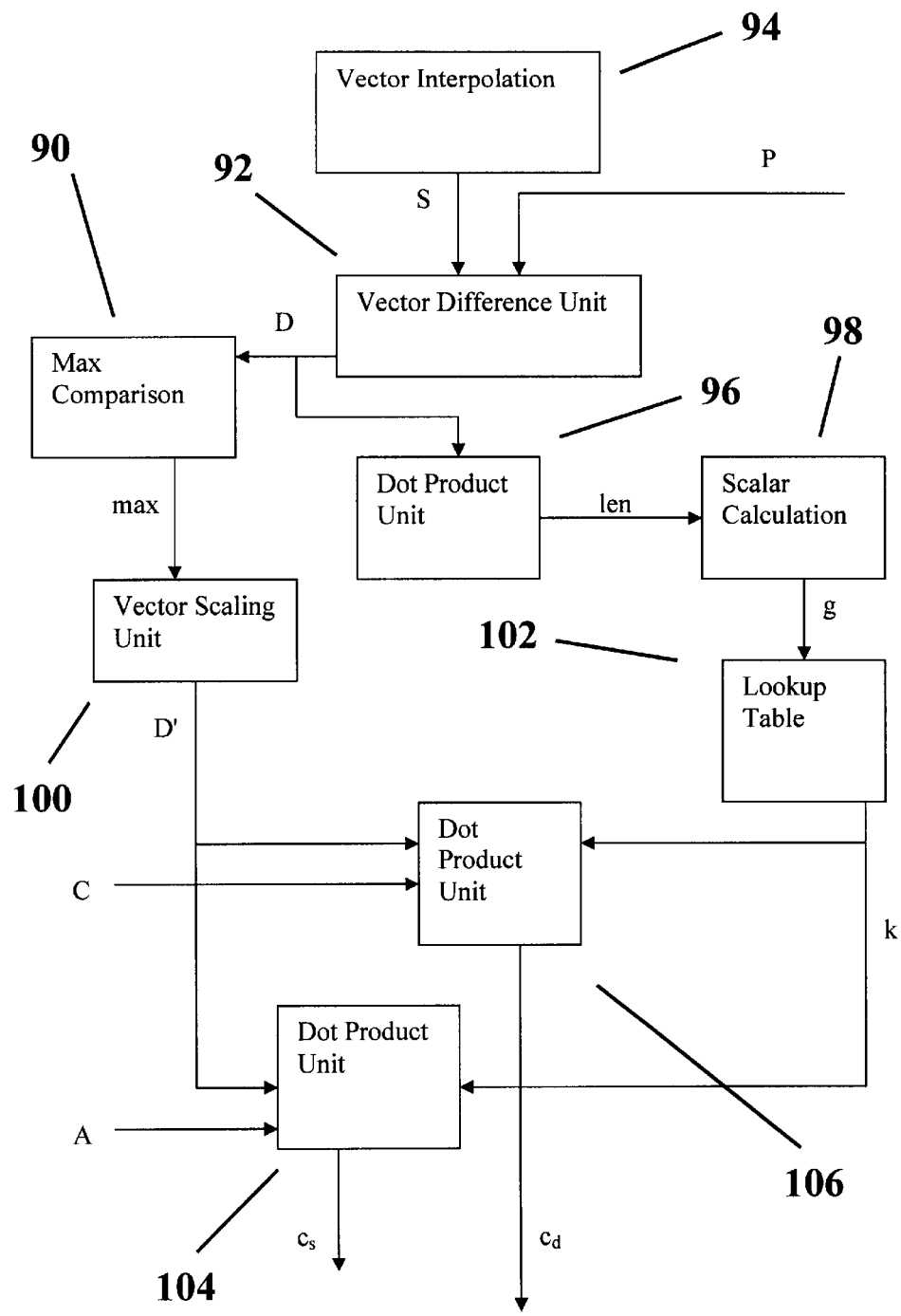
FIG. 9 is a diagram illustrating the preferred embodiment of the point light operations of the present invention.

FIG. 9 shows a logic diagram of the point light operations of the present invention. Point light operations are performed on the same (per-pixel) basis as the above detailed per-pixel operations. In a preferred embodiment, the point light operations are performed in parallel with the per-pixel operations. Alternate embodiments perform point light operations in series with per-pixel operations. The hardware point light source operations assume the presence of a current polygon, a set of 3D surface position vectors ($S_1$=$S_x$: x=number of polygon vertices) which give the position in view coordinate space of each polygon vertex, and a 3D point light source vector, P, which gives the location of the point light source relative to the view coordinate system. It is further assumed that all 3D vectors are given in standard floating point notation (i.e., sign bit, exponent, and mantissa fields). At block 94, surface position vectors $S_1$–$S_x$ are interpolated at the current pixel to produce 3D current surface position vector S. At block 92, 3D difference vector D is calculated by vector subtraction where D=P–S. The subtraction is performed with high-speed vector addition (subtraction) hardware. At block 90, the component of D (either x, y, or z) with the largest absolute value, max, is found. In a preferred practice, only the exponent fields of the D component values are compared and max is determined to be the component with the greatest exponent value. At block 96, the length of vector D squared, len, is calculated in parallel by taking the dot product of D with itself (i.e., the square of the x component added to the square of the y component added to the square of the z component). The dot product can be performed efficiently with fast dot product/multiply-add hardware. Alternate embodiments do the above-mentioned length calculation in series rather than in parallel. At block 100, D is scaled by the nearest power of 2 of max (the largest component value in D) producing scaled 3D difference vector D'. A preferred method for the above-mentioned scaling of D first finds a signed scalar exponent difference value, e, by subtracting the exponent field value of max from the exponent field value of 1.0 (usually 127 in standard 32-bit floating point notation). The e value is then added to the exponent fields of each component in D. If the addition of e to an exponent field value yields a negative number, the field value is clamped to zero. At block 98, scalar length value g is calculated by adding 2e to the exponent value of len. At block 102, the g value is used to address a preferred one-dimensional lookup table, yielding scalar value k. In a preferred practice, the k value is bi-linearly interpolated from the nearest two lookup table values. At blocks 106 and 104, diffuse and specular lighting coefficients are calculated for the point light source. This stage further assumes the presence of a 3D composite surface vector C and a 3D view reflection vector A, preferably obtained from the per-pixel operations of the present invention. The diffuse component value is calculated by taking the dot product of C and D' and multiplying said dot product by k. Likewise, the specular component value is calculated by taking the dot product of R and D' and multiplying said dot product by k. It should be obvious to those skilled in the art that the light source coefficient calculation of point light sources in the above-described manner is comparable to the previously detailed calculation of light coefficient values in the per-pixel operations of the present invention with the addition of the extra step of scaling by the k value. In a preferred hardware embodiment, the point light operations work in conjunction with the per-pixel operations, providing 3D vector D', which is taken as a light source direction vector, and the scalar k value. The per-pixel operations, in turn, use the D' as a light source vector (L) and perform dot product calculations with the C and A vectors in the previously detailed manner. The per-pixel operations also have a logic element that optionally scales the $c_s$ and $c_d$ values produced by said dot product operations by the k scalar value (if the light source is a point light source).

The above section details a practical and efficient hardware configuration for the real-time calculation of normalized 3D surface and reflection vectors where the surface direction is interpolated and dynamically combined with bump map values on a per-pixel basis. Likewise, the hardware described above calculates, in real-time, diffuse and specular lighting coefficient values for one or more directional light sources from a dynamically variable surface. Furthermore, the above hardware configuration is able to calculate, in real-time, diffuse and specular lighting coefficient values for one or more point light sources from a dynamically variable surface. The embodiments described above are included for the purpose of describing the present invention, and as should be recognized by those skilled in the applicable art, is not intended to limit the scope of the present invention as defined by the appended claims and their equivalents.

I claim:

1. A method for shading polygon surfaces in a real time rendering system comprising the steps of:
   providing at least one polygon surface to be shaded, said polygon surface comprised of a plurality of pixels and including at least one surface angle;
   providing at least one point light source; and
   calculating using dedicated computer hardware, for substantially each drawn pixel of said polygon surface, a substantially normalized 3D surface direction vector and a 3D point light vector without the use of a square root type operation.

2. The method of claim 1 further comprising the step of calculating a diffuse light value using the surface direction vector and the point light vector.

3. The method of claim 2 further comprising the step of calculating a reflection vector.

4. The method of claims 3 further comprising the step of calculating a specular light value using the point light vector and the reflection vector.

5. The method of claim 4 further comprising the step of providing a bump map useful to determine the surface angle vector and the reflection vector.

6. A method for shading polygon surfaces in a real time rendering system for drawing a plurality of drawn pixels comprising the steps of:

providing at least one polygon having a polygon surface to be shaded, said surface comprising a plurality of pixels, and said surface including at least one surface angle;

providing at least one point light source, said light source having a corresponding three-dimensional light source vector;

providing a bump map, said bump map having corresponding bump map vectors; and using a processor to calculate, for substantially each drawn pixel of said surface, a substantially normalized three dimensional (3D) surface direction vector generated from said at least one surface angle and said bump map, the processor having dedicated hardware for the calculation of the substantially normalized three dimensional (3D) surface direction vector and wherein processors calculates the 3D vector without calculating a square root.

7. The method of claim 6 wherein said at least one surface angle comprises a 3D vertex normal vector.

8. The method of claim 7 further comprising the step of converting the 3D vertex normal vector to a two dimensional (2D) vector.

9. The method of claim 8 wherein a plurality of 2D vectors are converted from a plurality of 3D vertex normal vectors and further comprising interpolating said 2D vectors for a drawn pixel.

10. The method of claim 9 further comprising combining said interpolated 2D vectors with bump map vectors to generate 2D composite surface angle vectors.

11. The method of claim 10 further comprising converting said 2D composite vectors to substantially normal 3D surface direction vectors.

12. The method of claim 11 wherein said step of converting said 2D composite surface vectors comprises using a lookup table.

13. The method of claim 10 further comprising calculating 2D reflection vectors from said 2D composite surface angle vectors.

14. The method of claim 13 further comprising converting said 2D reflection vectors to 3D reflection vectors.

15. The method of claim 13 wherein the step of converting said 2D reflection vectors to 3D reflection vectors comprises using a lookup table.

16. The method of claim 8 wherein the step of converting the 3D vertex normal vector to a two dimensional (2D) vector comprises converting the 3D vertex vector such that the length of the 2D vector is proportional to the angle between the corresponding 3D vector and a fixed 3D vector.

17. The method of claim 7 further comprising rotating said at least one vertex normal vector to a fixed coordinate system; and then converting the 3D vertex normal vector to a two dimensional (2D) vector.

* * * * *